Feb. 4, 1964 C. D. SPARLING 3,120,323
NESTABLE AND TIERABLE RECEPTACLES
Filed April 30, 1962 6 Sheets-Sheet 4
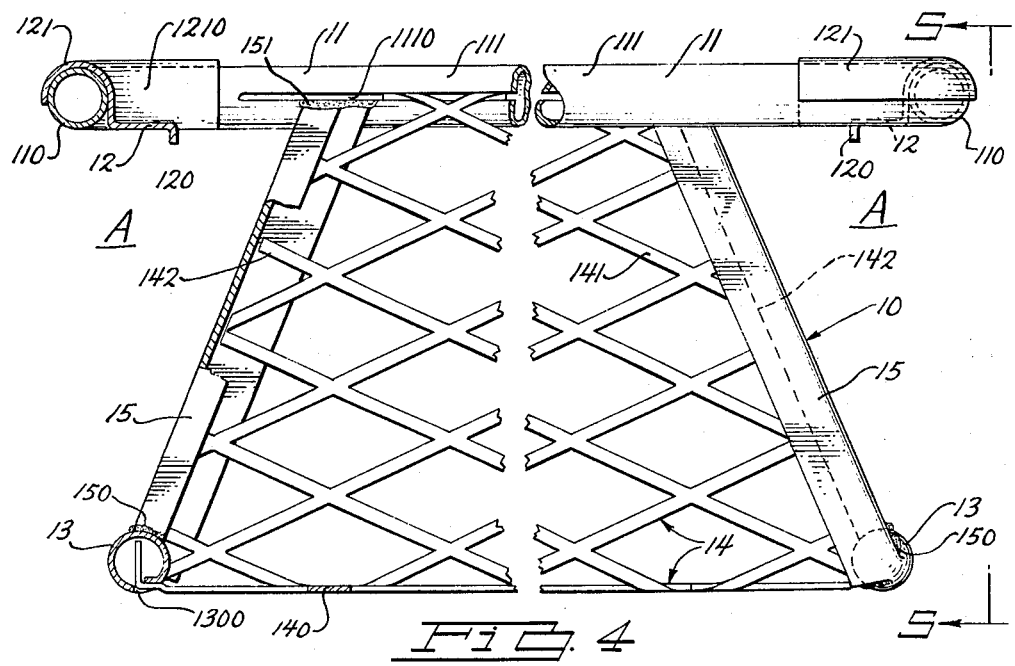
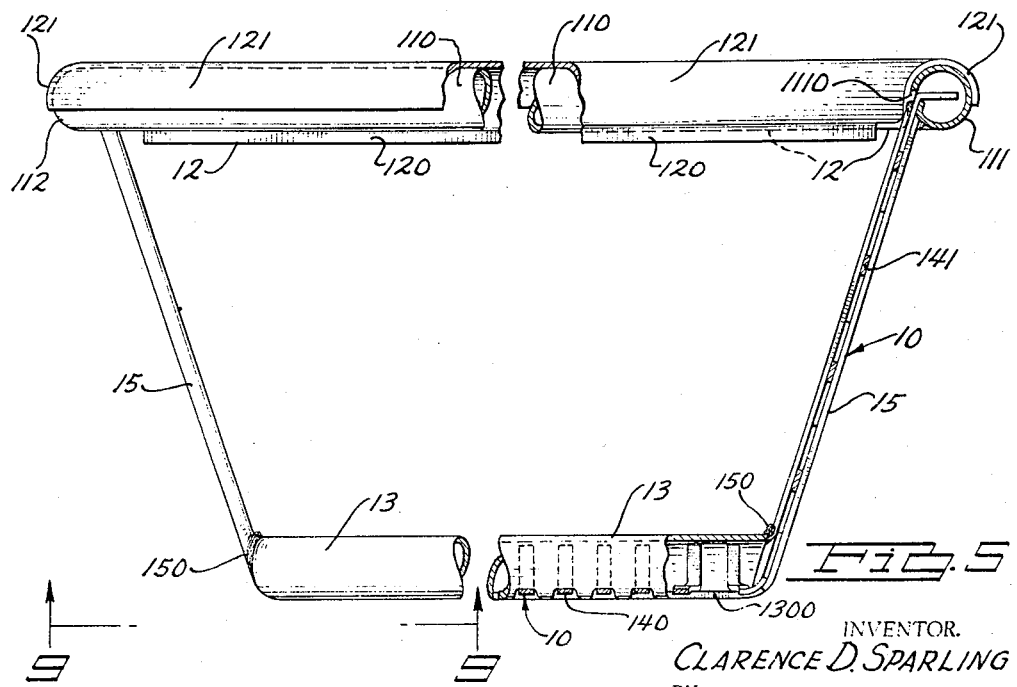
INVENTOR.
CLARENCE D. SPARLING
BY
ATTORNEY

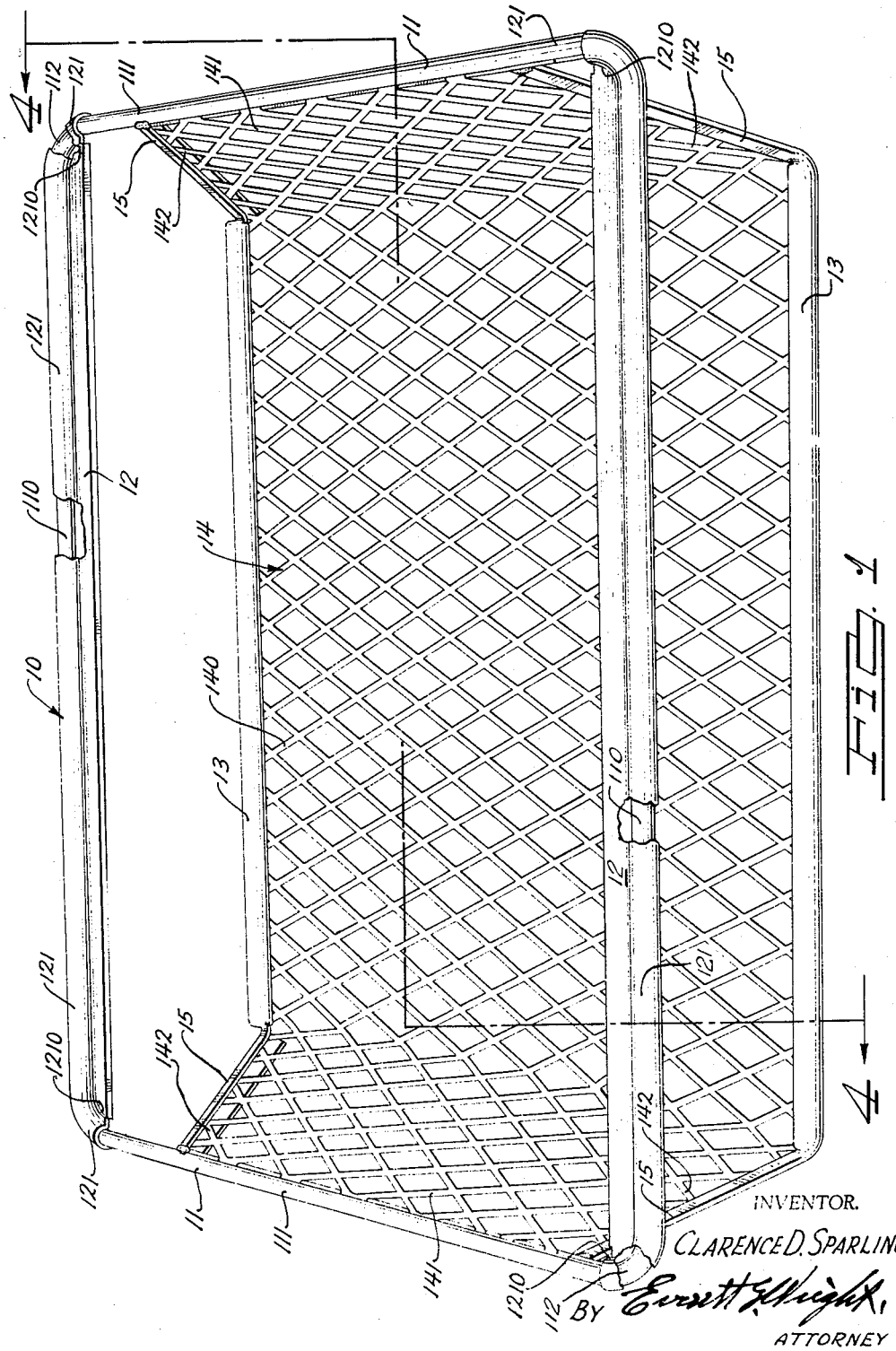

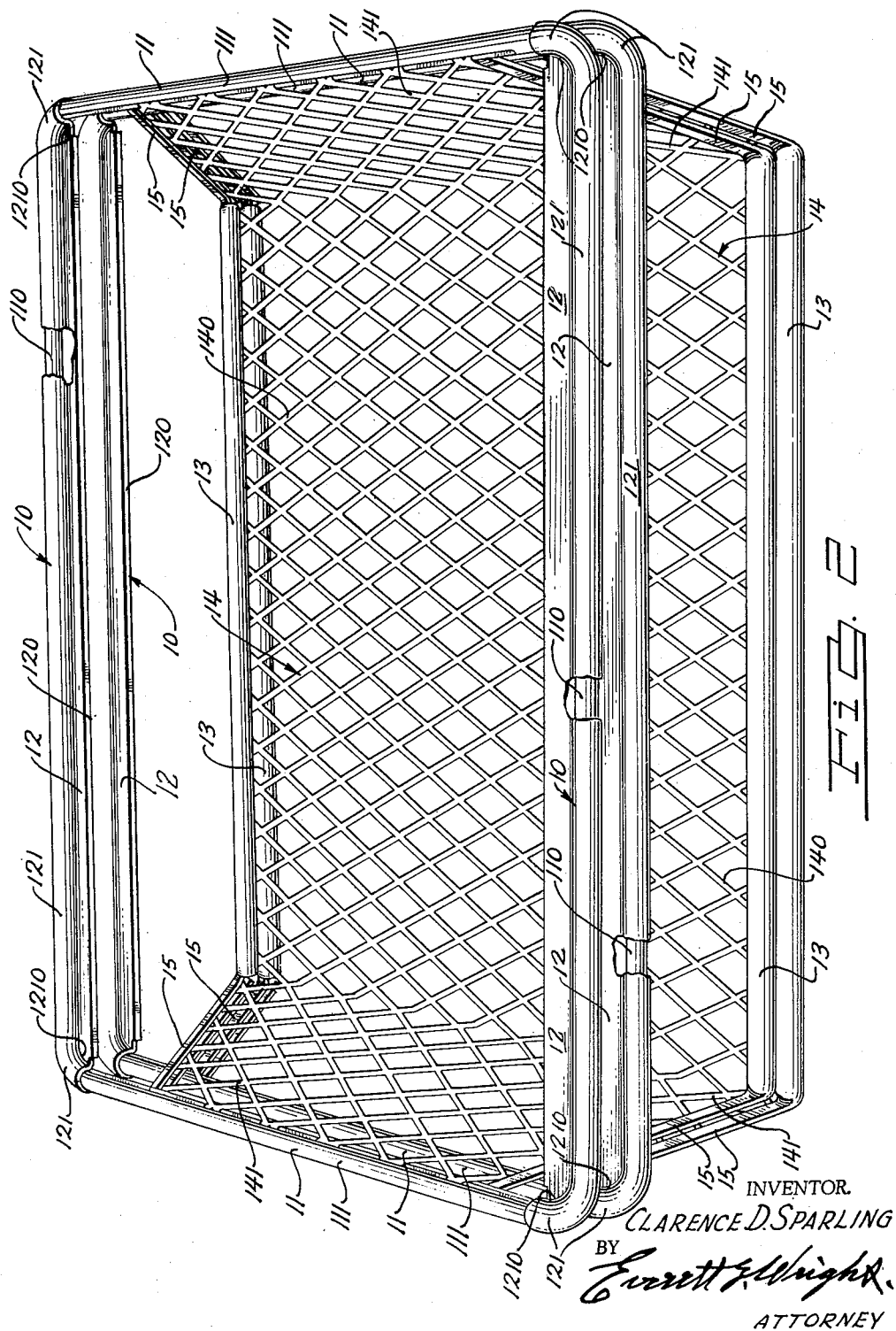

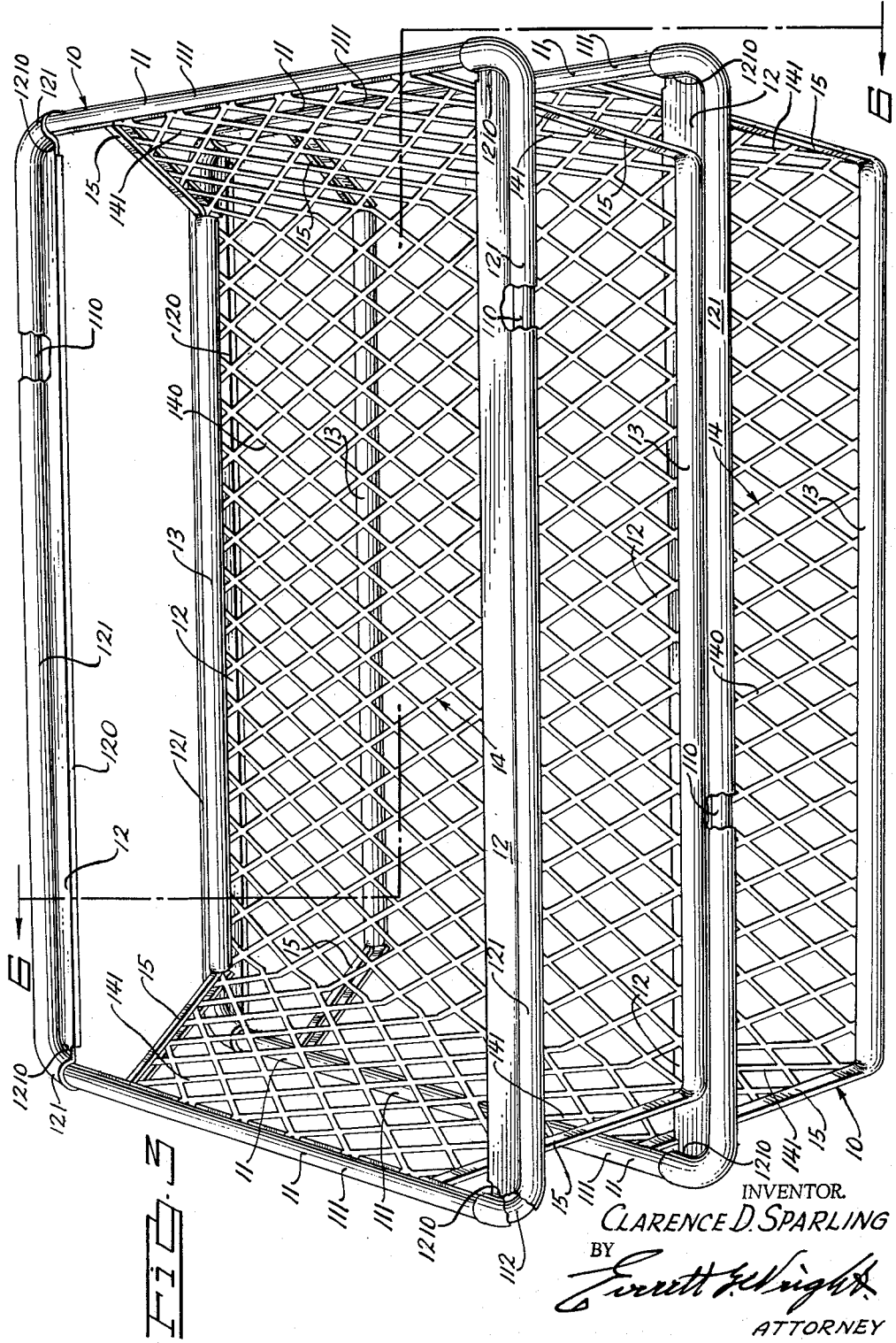

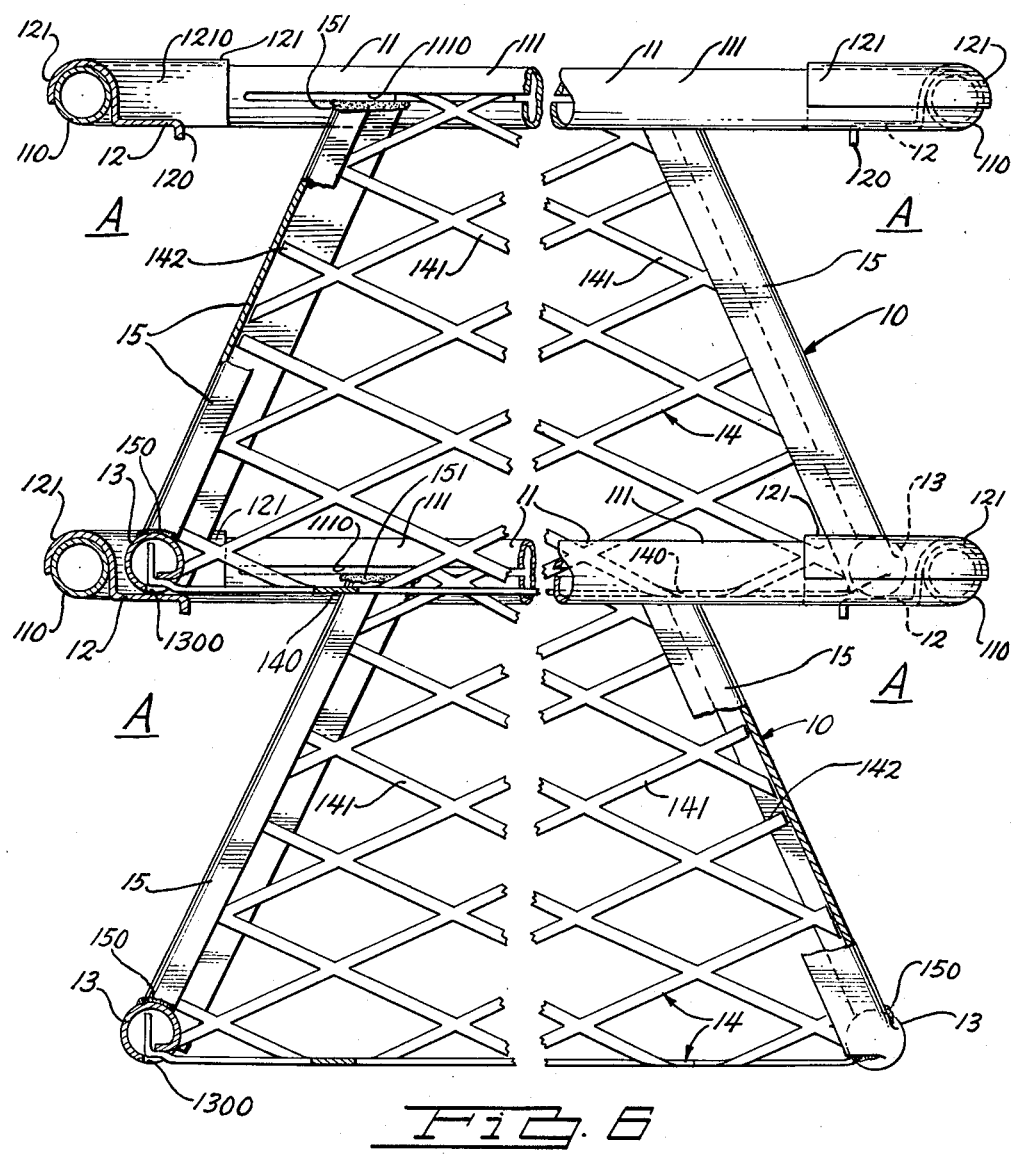

Feb. 4, 1964 C. D. SPARLING 3,120,323
NESTABLE AND TIERABLE RECEPTACLES
Filed April 30, 1962 6 Sheets-Sheet 6
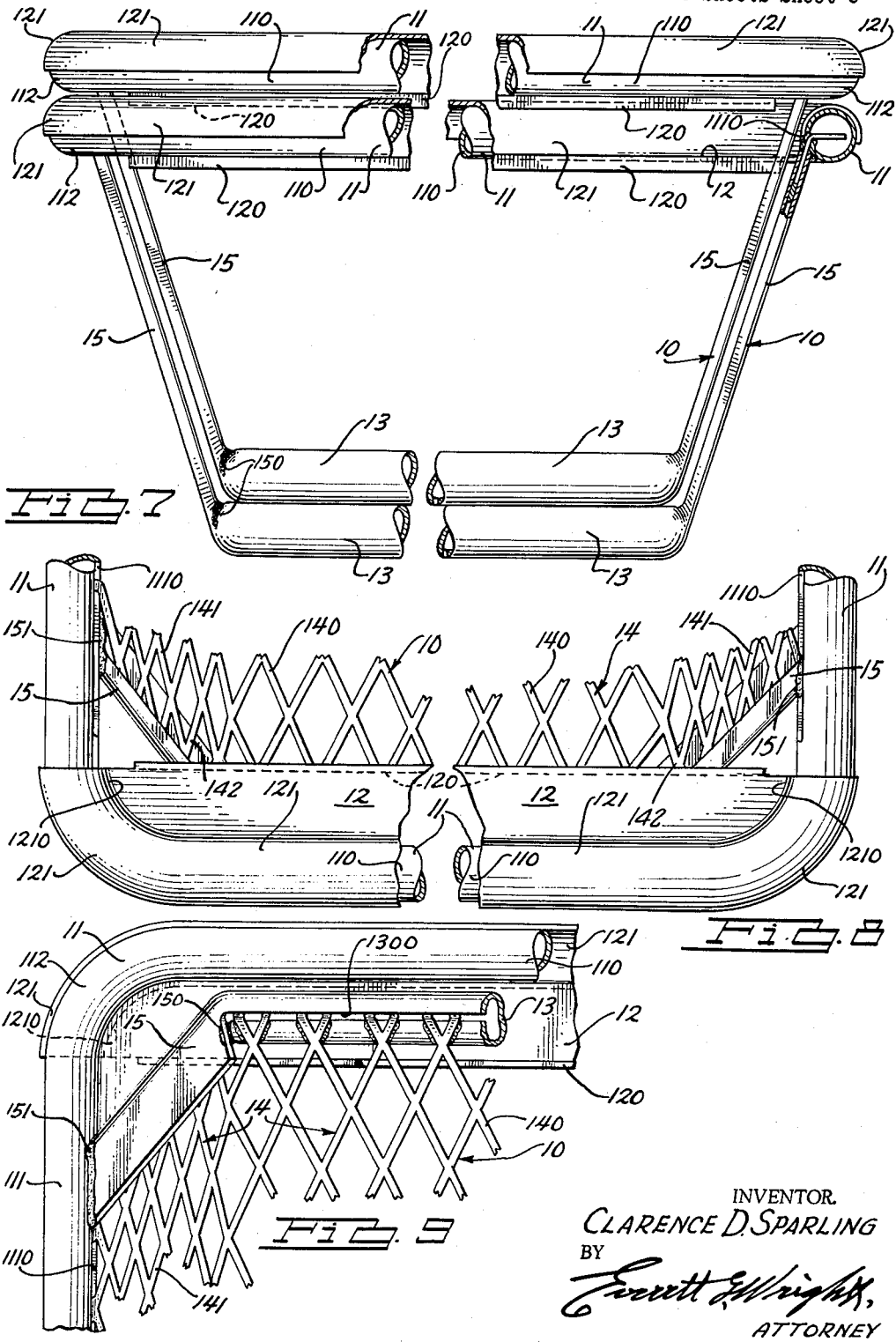
INVENTOR.
CLARENCE D. SPARLING
BY
Everett E. Wright,
ATTORNEY

United States Patent Office 3,120,323
Patented Feb. 4, 1964

3,120,323
NESTABLE AND TIERABLE RECEPTACLES
Clarence D. Sparling, 199995 Snowden, Detroit 35, Mich.
Filed Apr. 30, 1962, Ser. No. 190,901
4 Claims. (Cl. 220—97)

This invention relates to improvements in nestable and tierable receptacles or containers of the basket type employable as tote baskets, for storage stacks, and for other like and similar purposes.

The primary object of the invention is to provide an improved, simple, effective and economical nestable and tierable basket type container of an inverted generally frusto-pyramidal shape having a rigid rectangular upper frame and lower rigid frame side members employing an open mesh material for its bottom and ends fabricated into a rugged integral whole, and including novel skid seat means on its upper frame for conveniently receiving, locating and supporting in tiered relationship thereon a like nestable and tierable container.

A further object of the invention is to provide a nestable and tierable basket type container comprising a complete rectangular closed loop type tubular upper frame having side and end frame members with rounded corners therebetween, the said upper side frame members each including a skid seat element fixed to the said side frame member and to the rounded corners at the juncture of the upper side and adjacent end frame members and cantilevering inwardly therefrom substantially at the elevation of the bottom of said upper frame members, the said rounded corner and end frame member at the end of each said skid seat element providing a skid stop at the end of each skid seat element, a lower side frame member somewhat shorter than said upper side frame member disposed below and in vertical alignment with each said skid seat element, the inside of the upper end frame members and the bottom of the lower side frame members being slotted to accommodate an end and bottom closure, a generally U-shaped expanded metal flat bottom and diagonally outwardly and upwardly extending end closure formed with its upper end edges and its bottom side edges telescoped into the slotted upper end and lower side frame members, and a reinforcement element extending between each end of each lower side frame member and the adjacent end member of the upper closed loop type tubular frame at a point laterally inwardly of a rounded corner thereof, each said reinforcement element being formed to encompass a side edge of the adjacent end closure, and weldments securing said upper and lower frame members, said skid seat elements, said bottom and end closure, and said reinforcements into an integral whole; the bottom side frame members being shorter than the skid seat elements and disposed in vertical alignment therewith permitting a plurality of nestable and tierable containers to be readily and accurately tiered one upon the other with access thereto through the open sides thereof, the sides of the nestable and tierable container being open and the side edges of the end closure being disposed diagonally upwardly and inwardly from the ends of the bottom frame members permitting the bottom of one nestable and tierable container to be swung laterally to a position below the top of another like container and then completely nested vertically within said like container.

Still another object of the invention is to provide relatively light weight yet strong and rugged nestable and tierable containers each employing a rectangular tubular upper frame and a pair of lower tubular side frames including on the side members of said upper frame a skid seat cantilevered inwardly therefrom disposed at a level substantially at the bottom of said side and end members of said upper frame, the said lower side frame members being spaced in alignment below said skid seats and being shorter than the said skid seats, a generally U-shaped bottom and end closure member fixed to the upper end members and said lower side members leaving an angular reentrant notch at the ends of each said end closure member sufficiently deep adjacent said upper frame members to admit of nesting a pair of said containers when not in use, a reinforcement along the edge of each end closure member each secured at the ends thereof to an upper frame member inwardly of an outer end thereof and to an end of a lower side member, the said closure member being preferably of expanded metal disposed in suitably located grooves provided in the upper end frame and lower side frame members, said skid seat, said U-shaped closure member and said reinforcements being welded into an integral whole having substantial resistance to loadings and pressures exerted thereon from all directions.

Other objects of the invention will become apparent by reference to the following detailed description taken in connection with the accompanying drawings, in which:

FIG. 1 is a view in perspective of a nestable and tierable container embodying the invention.

FIG. 2 is a view in perspective of two such containers shown in their nested relationship.

FIG. 3 is a view in perspective of two such containers shown in their tiered relationship.

FIG. 4 is an enlarged transverse view taken on the line 4—4 of FIG. 1 of a single nestable and tierable container shown part in section and part in elevation.

FIG. 5 is an enlarged longitudinal view of a single nestable and tierable container shown part in section and part in elevation.

FIG. 6 is an enlarged transverse view taken on the line 6—6 of FIG. 3 of two such containers shown in tiered relationship.

FIG. 7 is an enlarged longitudinal view of two such containers shown in nested relationship.

FIG. 8 is a fragmentary top plan view of one side of a nestable and tierable container.

FIG. 9 is a fragmentary bottom view taken on the line 9—9 of FIG. 5.

Referring now to the drawings wherein like reference numerals refer to like and corresponding parts throughout the several views, the particular embodiment of a tierable and nestable container 10 disclosed for the purpose of illustrating the invention comprises a preferably rectangular closed loop type tubular upper frame 11 having a pair of side upper frame members 110 and a pair of end upper frame members 111 with a rounded corner 112 between each side and end upper frame members 110 and 111. A skid seat element 12 is preferably cantilevered laterally inwardly from said side upper frame members 110 and is connected to the rounded corners 112 at the end of each said side upper frame member 110. A lower preferably tubular side frame member 13 is disposed parallel to and below each skid seat element 12 but somewhat shorter than the said skid seat elements 12.

The said tierable and nestable container 10 preferably has a U-shaped bottom and end closure 14 having a flat bottom 140 and two diagonally upwardly and outwardly sloping ends 141, the said bottom and end closure 14 having the side edges of its flat bottom 140 and the end edges of its sloping ends 141 formed to telescope respectively into a slot 1110 formed in the inner side of the upper end frame member 111 and into a slot 1300 formed in the bottom of the lower side frame members 13. The said bottom and end closure 14 has the side edges of its flat bottom 140 and the end edges of its sloping ends 141 secured respectively by suitable weldments to the said lower side frame members 13 and the upper end frame members 111 at the said slots 1300 and 1110 therein.

The upwardly and outwardly sloping ends 141 of the U-shaped bottom and end closure 14 are cut away at 142 diagonally upwardly from the end of the lower side frame member 13 to a suitable point on the upper end frame member 111 inwardly from the skid seat elements 12 to provide a reentrant notch or clearway "A" along each side of the nestable and tierable container 10 whereby to permit one (an upper) container 10 to be swung laterally into a nested position within another (a lower) container 10 as best shown in FIGS. 2 and 7.

A smooth surfaced preferably U-shaped reinforcement 15 is preferably telescoped over and welded to the diagonally upwardly disposed edge 142 of the upwardly and outwardly sloping ends 141 of the U-shaped bottom and end closure 14, each said U-shaped reinforcement 15 being secured by such means as weldments at its lower end at 150 to an end of the lower side frame member 13 and at its upper end at 151 to the adjacent upper end frame member 111 of the tubular upper frame 11 laterally inwardly of the skid seat element 12.

Each skid seat element 12 is generally horizontal in shape and preferably has a laterally inner downwardly formed flange 120 along its inner edge for the purpose of stiffening the same. The skid seat element 12 is preferably provided with an outer arcuate side and end flange 121 which is formed to fit snugly over the side upper tubular frame member 110 and over the contiguous rounded corners 112 at the ends of the said side upper tubular frame member 110 as clearly shown throughout the drawings. Each said arcuate side and end flange 121 of the skid seat element 12 is preferably welded to the side upper tubular frame member 110 and contiguous rounded corners 112 therebelow. To provide a skid seat stop 1210 at the end of each skid seat element 12, the top of the skid seat 12 is preferably disposed substantially horizontally parallel to the bottom of the tubular upper frame 11.

The upwardly and outwardly sloping ends 141 of the bottom and end closure 14 are disposed on such an angle as to permit one container 10 to nest neatly into another as best shown in FIGS. 2 and 7 after swinging one (upper) container 10 laterally while lowering first one lower side frame member 13 and then the other lower side frame member 13 of the one container 10 alternately below the upper side frame member 110 and skid seat element 12 on each side of the other (lower) container 10.

As hereinbefore mentioned, all of the several elements of the nestable and tierable containers 10 are preferably fixed together by welding which, with the particular construction disclosed, provides a rugged and extremely strong container 10 capable of withstanding hard usage without continual repairs as is required in many other types of prior art constructions.

Furthermore, the provision of the upper skid seat and skid stops at the ends of the skid seat permits rapid and accurate tiering of nestable and tierable containers embodying the invention.

While the material employed is preferably steel tubing and steel mesh welded together, it is obvious that other materials and means for securing the same into an integral whole may be employed. However, tests indicate that the construction of the instant invention is far superior to formed wire and the combination of formed wire and sheet steel containers presently employed. For uses where sanitary and health considerations are paramount, nestable and tierable containers of the invention may be chrome or nickel plated, and for other uses other suitable plating or dip finishes may be applied.

Although but a single embodiment of the invention has been disclosed herein and described in detail, it is obvious that many changes may be made in the size, shape, arrangement and details of the various elements of the invention, all without departing from the spirit and scope thereof as defined by the appended claims.

I claim:
1. A container nestable and tierable with like containers comprising
   a rigid rectangular upper frame including rigid side and end members,
   fixed skid seat means extending inwardly of and along said upper rigid side frame members substantially at the elevation of the bottom thereof and formed at said end frame members to provide stop means at the end of said skid seat means,
   a pair of lower rigid side frame members shorter than said upper side frame members symmetrical longitudinally therewith and disposed in vertical spaced relationship below said skid seat means,
   means fixed to said upper end frame members of said rigid rectangular upper frame and to said lower rigid side frame members forming a continuous bottom and ends of said container, said bottom being substantially the length of said lower rigid side frame members, said ends sloping upwardly and outwardly from said bottom to said upper end frame members and terminating at said upper end frame members inwardly of said fixed skid means,
   the said ends having their sides sloping upwardly and inwardly from the ends of said lower rigid side frame members to the top end frame members at a point sufficiently inwardly from the inner edge of said fixed skid seat means whereby to permit the bottom of one container to be tilted and swung laterally and lowered into nested relationship within a like container therebelow.

2. A container nestable and tierable with like containers comprising
   a rigid rectangular upper frame including continuous tubular rigid side and end members,
   fixed skid seat means comprising a formed plate extending over said upper side frame member and inwardly therealong substantially at the elevation of the bottom thereof and formed at said upper end frame members to provide stop means at the ends of said skid seat means,
   a pair of lower rigid tubular side frame members shorter than said upper side frame members symmetrical longitudinally therewith and disposed in vertical spaced relationship below said skid seat means,
   mesh means fixed to and extending within said upper end frame members of said rigid rectangular upper frame and fixed to and extending within said lower rigid side frame members forming a continuous bottom and ends of said container, said bottom being substantially the length of said lower rigid side frame members, said ends sloping upwardly and outwardly from said bottom to said upper end frame members and terminating therein inwardly of said fixed skid means thus forming said ends narrower at their top than at their bottom whereby to admit of nesting one such container within the other.

3. A container nestable and tierable with like containers comprising
   a rigid rectangular tubular upper frame including rigid side and end members with rounded corners therebetween,
   flat fixed skid seat means extending inwardly of and along said upper rigid side frame members substantially at the elevation of the bottom thereof and formed at said side frame members and at said corners between said side and end frame members to overlie the same and to provide stop means at the end of said skid seat means,
   a pair of lower rigid tubular side frame members shorter than said upper side frame members symmetrical longitudinally therewith and disposed in vertical spaced relationship below said skid seat means,
   mesh means fixed to and extending within the bottom of said upper end frame members of said rigid rectangular upper frame and fixed to and extending within the bottom of said lower rigid side frame members forming a continuous bottom and ends of said container, said bottom being substantially the length of said lower rigid side frame members, said ends sloping upwardly and outwardly from said bottom to said upper end frame members and terminating within said upper end frame members inwardly of said fixed skid means, the said ends having their sides sloping upwardly and inwardly from the ends of said lower rigid side frame members to the top end frame members at a point sufficiently inwardly from the inner edge of said fixed skid seat means whereby to permit one container to be tilted and swung laterally into nested relationship within a like container therebelow, and means covering and reinforcing the sides of said upwardly and outwardly sloping ends fixed thereover and to said rigid upper end frame members and to said lower rigid side frame members at the ends thereof.

4. A container nestable and tierable with like containers comprising a rigid rectangular tubular upper frame including rigid side and end members with rounded corners therebetween, flat fixed skid seat means extending inwardly of and along said upper rigid side frame members substantially at the elevation of the bottom thereof and formed at said side frame members and at said corners between said side and end frame members to provide stop means at the end of said skid seat means, a pair of lower rigid tubular side frame members shorter than said upper side frame members symmetrical longitudinally therewith and disposed in vertical spaced relationship below said skid seat means, expanded metal mesh means disposed at its ends within slots provided in the bottom of said upper end frame members of said rigid rectangular upper frame and disposed at its sides within slots provided in the bottom of said lower rigid side frame members and welded thereto forming a continuous bottom and ends of said container, said bottom being substantially the length of said lower rigid side frame members, said ends sloping upwardly and outwardly from said bottom to said upper end frame members and terminating within said upper end frame members inwardly of said fixed skid means, the said ends having their sides sloping upwardly and inwardly from the ends of said lower rigid side frame members to the top end frame members at a point sufficiently inwardly from the inner edge of said fixed skid seat means whereby to permit one container to be tilted and swung laterally into nested relationship within a like container therebelow, and means covering the free sloping sides of said expanded metal ends providing a smooth finished edge thereat.

References Cited in the file of this patent

UNITED STATES PATENTS

| | | |
|---|---|---|
| 2,502,781 | Erickson | Apr. 4, 1950 |
| 2,581,613 | Ullrich | Jan. 8, 1952 |
| 2,916,293 | Lang | Dec. 8, 1959 |
| 2,925,919 | Wilson | Feb. 23, 1960 |

FOREIGN PATENTS

| | | |
|---|---|---|
| 297,177 | Germany | May 28, 1914 |